US012084854B2

United States Patent
Wang et al.

(10) Patent No.: US 12,084,854 B2
(45) Date of Patent: Sep. 10, 2024

(54) TOP-DOWN CONSTRUCTION METHOD FOR MULTI-STOREY BASEMENT WITH FULL STEEL STRUCTURE

(71) Applicant: China Construction Third Engineering Bureau Group South China Co., Ltd., Guangzhou (CN)

(72) Inventors: Xiuyi Wang, Guangzhou (CN); Xiaolu Deng, Guangzhou (CN); Caihui Wu, Guangzhou (CN); Bin Chen, Guangzhou (CN); Hailiang Peng, Guangzhou (CN); Weimin Wen, Guangzhou (CN)

(73) Assignee: China Construction Third Engineering Bureau Group South China Co., Ltd., Guangzhou (CN)

( * ) Notice: Subject to any disclaimer, the term of this patent is extended or adjusted under 35 U.S.C. 154(b) by 0 days.

(21) Appl. No.: 18/489,006

(22) Filed: Oct. 18, 2023

(65) Prior Publication Data

US 2024/0133175 A1 Apr. 25, 2024
US 2024/0229451 A9 Jul. 11, 2024

(30) Foreign Application Priority Data

Oct. 24, 2022 (CN) .......................... 202211301201.6

(51) Int. Cl.
*E04B 1/35* (2006.01)
*E02D 29/02* (2006.01)

(52) U.S. Cl.
CPC ............ *E04B 1/3516* (2013.01); *E02D 29/02* (2013.01)

(58) Field of Classification Search
CPC .......... E04B 1/3516; E04B 1/35; E02D 29/02
(Continued)

(56) References Cited

U.S. PATENT DOCUMENTS 5,469,684 A * 11/1995 Franklin ............... E04B 1/3516
425/65
10,745,919 B1 * 8/2020 Houston ................... E04B 5/10
(Continued)

FOREIGN PATENT DOCUMENTS

CN 1279319 A 1/2001
CN 101498133 A 8/2009
(Continued)

OTHER PUBLICATIONS

YouTube Video #1 by Ista Sazeh. Title: top down Method posted on Mar. 10, 2021 link: https://www.youtube.com/watch?v=KYjCwPGOZ-o Shortened link: tinyurl.com/IstaSazeh.*
(Continued)

*Primary Examiner* — Paola Agudelo (57) ABSTRACT

A top-down construction method for a multi-storey basement with a full steel structure is provided, including: S1. constructing a diaphragm wall permanent structure; S2. conducting an open excavation, then constructing a first layer structural beam and slab; S3. conducting an underground excavation on an underground second layer earthwork, then constructing structural beam and slab and vertical shear wall on underground first layer; S4. excavating earthworks from an underground third layer to an underground N−1 layer, and constructing structural beams and slabs and vertical shear walls; S5. conducting the underground excavation on an underground N layer earthwork, and constructing a two-span structural steel beam; S6. conducting the underground excavation on earthworks of bottom plate layer, constructing remaining structural beams and slabs and vertical shear wall; S7. conducting the underground excavation on earthworks of bearing platform and water collection well; S8. constructing earth intakes of the podium and the basement.

9 Claims, 5 Drawing Sheets

(58) Field of Classification Search
USPC .................................................. 52/741.11
See application file for complete search history.

(56) References Cited

U.S. PATENT DOCUMENTS

| | | | |
|---|---|---|---|
| 2004/0134162 A1* | 7/2004 | Douglas | E04B 1/12 |
| | | | 52/741.1 |
| 2011/0047889 A1* | 3/2011 | Gad | E04H 1/005 |
| | | | 52/650.1 |
| 2016/0010302 A1* | 1/2016 | Mellier | E02D 11/00 |
| | | | 405/287 |
| 2016/0265217 A1* | 9/2016 | Hayes | E04B 1/1903 |
| 2019/0106877 A1* | 4/2019 | Zaina | E04B 1/34 |
| 2019/0338515 A1* | 11/2019 | Vanker | E04C 2/326 |
| 2021/0131104 A1* | 5/2021 | Hsieh | E04B 1/2403 |
| 2022/0213684 A1* | 7/2022 | Besjak | E04C 2/26 |
| 2022/0333388 A1* | 10/2022 | Benvenuto | E04G 3/246 |
| 2023/0374775 A1* | 11/2023 | Stewart | E04B 1/3511 |

FOREIGN PATENT DOCUMENTS

| | | |
|---|---|---|
| CN | 101736757 A | 6/2010 |
| CN | 105863042 A | 8/2016 |
| CN | 110017024 A | 7/2019 |
| CN | 110080525 A | 8/2019 |
| CN | 110080526 A | 8/2019 |
| CN | 110397278 A | 11/2019 |
| CN | 111485578 A | 8/2020 |
| CN | 111764578 A | 10/2020 |
| JP | 2000054409 A | 2/2000 |
| KR | 20190084633 A | 7/2019 |

OTHER PUBLICATIONS

YouTube Video #2 by Motion K. Title: Twinmotion. Posted on Dec. 12, 2020 link: https://www.youtube.com/watch?v=WOgIB8-NN4Y Shortened link: tinyurl.com/MotionK.*
Search report of CN202211301201.6.
Notification to Grant Patent Right.
First office action of Chinese application : CN202211301201.6.
Structural design and analysis of apartment tower in Nanjing using top-down construction method.
Design and Practice of Synchronous Construction of Twin-towersuperstructures and Underground Structures in Shanghai Soft Clay.

* cited by examiner

FIG. 5

TOP-DOWN CONSTRUCTION METHOD FOR MULTI-STOREY BASEMENT WITH FULL STEEL STRUCTURE

CROSS-REFERENCE TO RELATED APPLICATIONS

This application claims to the benefit of priority from Chinese Application No. 202211301201.6 with a filing date of Oct. 24, 2022. The content of the aforementioned applications, including any intervening amendments thereto, are incorporated herein by reference.

TECHNICAL FIELD

The present disclosure relates to the field of building construction technology, in particular to a top-down construction method for a multi-storey basement with full steel structure.

BACKGROUND

The top-down construction technology has many advantages such as protecting the environment, saving social resources, and shortening the construction cycle. It is an effective technical means for sustainable development of urban underground space and the construction of a conservation-oriented society, and is the development trend of future urban center engineering construction projects.

In the field of building construction, the traditional top-down construction method involves constructing a waterproof curtain structure around the building and a steel column in the middle, open excavating a layer of earthwork downwards, and then using ground formwork or setting up bent frames to construct the B 0 layer reinforced concrete structure. The earth intake is basically arranged in the basement area, it is necessary to wait for the concrete curing strength of the previous layer structure to meet the requirements before dismantling the bent frames and sequentially constructing downwards, and until the construction of the bottom plate structure is completed then the vertical wall and column structure can be constructed in sequence. This construction method requires a large investment in turnover materials, a large demand for material storage yards, and a large amount of secondary transportation work. However, the lifting times of existing lifting equipment is insufficient, and there is a serious shortage of ground material storage yards on the first layer, making transportation planning and organization difficult. In addition, the excavation volume of underground earthwork is large, and the underground excavation of the basement earthwork in the bottom plate layer is limited by the net height, resulting in low excavation efficiency and affecting the construction progress. In addition, there is a large amount of post structural work in the top-down construction of the basement, especially for the civil air defense structure, which requires the completion of the bottom plate construction before the construction can be carried out layer by layer from bottom to top. This severely restricts the advanced closing of the basement earth intake, greatly affecting the water stop of the basement roof and the indoor interpenetration construction of the basement. The more layers of the basement, the more obvious the problem is exposed.

Therefore, for high-rise and super high-rise buildings with multiple basement layers, large construction area, and high requirements for deformation control, structural quality, excavation efficiency, construction progress, and professional engineering lean interpenetration, the current traditional top-down construction process is no longer suitable for the construction needs of current building construction projects.

SUMMARY

In order to solve the above problems, the present disclosure provides a top-down construction method for a multi-storey basement with a full steel structure, which reduces the amount of material inputs, the need for stockpiles and the times of material lifting, so as to ensure smooth traffic organization on the site. There is no need to wait for the concrete curing cycle and the dismantling of the bent frames, so that the next layer of earth excavation can be carried out after the steel beams are installed, which speeds up the construction progress and shortens the construction period.

To achieve the above objectives, the present disclosure provides a top-down construction method for a multi-storey basement with a full steel structure, which includes the following steps:

S1. constructing a diaphragm wall permanent structure along a perimeter of a foundation pit, and setting an intermediate steel pipe column inside the foundation pit, wherein a steel beam connecting plate of basement layers are pre embedded into the diaphragm wall permanent structure during construction;

S2. conducting an open excavation on an underground first layer earthwork to a first layer open excavation elevation surface, and then constructing a first layer structural beam and slab, wherein the first layer structural beam and slab is composed of steel beams and steel-bars truss deck, and the first layer structural beam and slab is reserved with an earth intake in a podium area or a basement area, after a completion of the first layer structural beam and slab, constructing a tower above-ground structure upward;

S3. conducting an underground excavation on an underground second layer earthwork to a second layer underground excavation elevation surface, and then constructing an underground first layer structural beam and slab and an underground first layer vertical shear wall, wherein the underground first layer structural beam and slab reserves an earth intake in the podium area and the basement area, and synchronously constructing the tower above-ground structure upward;

S4. according to step S3, excavating earthworks from an underground third layer to an underground N−1 layer in sequence until a designed excavation elevation surface, and constructing structural beams and slabs from an underground second layer to an underground N−2 layer and vertical shear walls from the underground second layer to the underground N−2 layer, and the structural beams and slabs from the underground second layer to the underground N−2 layer are reserved with earth intakes in the podium area and the basement area; synchronously constructing the tower above-ground structure upwards, wherein N is a total number of underground layers excavated;

S5. conducting the underground excavation on an underground N layer earthwork to a Nth layer excavation elevation surface, and constructing an underground N−1 layer two-span structural steel beam facing inward along the edge of the foundation pit;

S6. conducting the underground excavation on earthworks of bottom plate layer to a bottom elevation surface of the bottom plate, constructing remaining structural beams and slabs on the underground N−1 layer and an underground N−1 layer vertical shear wall, wherein there are earth intakes provided between the underground N−1 layer inward two-span structural steel beam along an edge of the foundation pit and the remaining structural beams and slabs on the underground N−1 layer, and synchronously constructing the tower above-ground structure upwards;

S7. conducting the underground excavation on earthworks of a bearing platform and a water collection well to the designed elevation, and constructing an underground N layer bottom plate structure, then constructing by an underground N layer vertical shear wall, wherein the underground excavation on the earthworks of the bearing platform and the water collection well is excavated from a support edge to a direction of the earth intake;

S8. constructing the earth intakes of the podium and the basement after the construction of the underground N layer vertical shear wall is completed, wherein the earth intakes of the podium and the basement use a combination of the bottom-up construction and the top-down construction.

As an embodiment of the present disclosure, step S2 specifically includes: applying a backhoe excavation method starting from an edge of the diaphragm wall permanent structure, to conduct the open excavation from surrounding areas to a center of the earth intake until the first layer open excavation elevation surface, synchronously reserving a transportation channel for earthwork excavation, and using a tower crane to lift and construct the first layer steel beams and the steel-bars truss decks.

As an embodiment of the present disclosure, the first layer structural beam and slab is uniformly arranged with a plurality of earth intakes in the podium area and the basement area, each of the earth intakes with a diameter of 8-16 meters and an area of 150-256 square meters, and a spacing of 30 meters between two adjacent earth intakes.

As an embodiment of the present disclosure, the step S3 specifically includes: after concrete curing strength of the first layer structural beam and slab meets design requirements, applying a front shovel excavation method to excavate from a center of the earth intake to the surrounding area to the second layer underground excavation elevation surface, then laying a layer of a steel plate pavement with 3-5 meter wide on the second layer underground excavation elevation surface, using a truck crane to lift the steel beam from the earth intakes of the podium and the basement to the second layer underground excavation elevation surface, then using a steel beam horizontal barge truck to transport the steel beam from the earth intakes of the podium and the basement to a steel beam installation site through the steel plate pavement; respectively installing one jack mechanism above the steel beam on the same span of the construction layer and on the intermediate steel pipe column, installing and fixing the steel beam and the intermediate steel pipe column after conducting a vertical traction to the steel beam to a designed steel beam elevation through an action of the jack mechanism and a traction rope.

As an embodiment of the present disclosure, when excavating earthworks from the underground first layer to the underground N−1 layer, a clearance height from a bottom surface of the steel beam to the steel plate pavement is 1.8 meters.

As an embodiment of the present disclosure, step S4 further includes: setting a steel cantilever structure unloading platform on a non soil taking equipment occupying side of any or more earth intakes in a structure from the underground first layer to the underground N−1 layer according to requirements; the steel cantilever structure unloading platform is formed by welding or anchor bolts connecting of the cantilever steel beam and the frame steel beam, with a length of the cantilever is 2.5-3.0 meters and a width of the cantilever is 7-8.5 meters; the steel cantilever structure unloading platform is configured to place vertical staircase channels, and the structural beams and slabs from the underground first layer to the underground N−1 layer are used for material storage after the construction is completed.

As an embodiment of the present disclosure, constructing the underground first layer vertical shear wall after an excavation of the underground second layer, an installation of the steel beams, and a pouring of concrete for the steel-bars truss decks on the underground first layer; during the construction of the steel-bars truss decks on the underground first layer, the steel cantilever structure unloading platform is configured to conduct horizontal transportation of materials of the steel-bars truss decks, and the underground second layer to the underground N−1 layer are constructed according to this procedure.

As an embodiment of the present disclosure, step S8 specifically includes: for the podium earth intake structure, first constructing structural beam and slab on the first layer of the podium earth intake, then conducting a bottom-up construction of an above-ground structure of the podium and a top-down construction of an underground structure of the podium earth intake; for the basement earth intake structure, first constructing structural beam and slab on the underground N/2 layer, then conducting a bottom-up construction of the structure above the structural beam and slab on the underground N/2 layer and a top-down construction of the structure below the structural beam and slab on the underground N/2 layer; respectively installing one jack mechanism above the steel beam of the same span on the construction layer and the intermediate steel pipe column; after the steel beam is vertically pulled to the designed steel beam elevation by the jack mechanism and the traction rope, installing and fixing the steel beam and the intermediate steel pipe column, wherein when N is an odd number, the underground N/2 layer is taken from one layer up from the middle layer of the basement.

As an embodiment of the present disclosure, the tower above-ground structure is started to conduct construction after the construction of the first layer structural beam and slab is completed, and the structure of the podium area is started to conduct construction layer by layer upward after the construction of the structural beam and slab on the first layer of the podium earth intake is completed, until the podium structure is capped.

Compared with the prior art, the present disclosure has the following advantageous effects:

1. By providing a basement structural beam and slab which adopts a combination structure of steel beams and steel-bars truss decks, without the need for pouring cushion, setting up bent frames, and installing templates, the present disclosure reduces the amount of material input, storage yard requirements, and material lifting times, so as to ensure smooth traffic organization on the site. There is no need to wait for the concrete curing cycle and the removal of the bent frames. After the installation of the steel beams, the next layer of earthwork excavation can be carried out, accelerating the construction progress and shortening the construction period.

2. The present disclosure uniformly arranges earth intakes in the basement podium and basement area of the reverse working area, with large and numerous openings. Each earth intake has a diameter of 8-16 meters, an area of 150-256 square meters, and a spacing of 30 meters between two adjacent earth intakes. It can meet the requirements of equipment occupancy, vehicle traffic organization, and necessary material storage yard planning, so as to improve natural ventilation effect, and reduce the investment of ventilation measures, reduce the horizontal excavation and transportation of earthwork and the investment of excavator equipment, and improve the efficiency of excavation.

3. The present disclosure provides a steel cantilever structure unloading platform on the non equipment occupied side of earth intakes of the underground first layer to the underground N−1 layer structure according to actual needs, which is used for personnel going up and down stairs and material supply platforms, solving the problem of insufficient ground material storage yard. Moreover, the material is transported up and down and horizontally for very short distances at the same earth intake, and is lifted using a truck crane, while also cooperating with tower crane lifting, which reduces the demand for the use of above-ground tower cranes, allowing for efficient construction of both above-ground structures and basements.

4. The present disclosure constructs a vertical shear wall structure immediately after pouring concrete into the steel-bars truss decks of each basement layer, which inserts the vertical structure or civil defence structure in advance compared to traditional methods, thereby shortening the construction period. In this application, by setting the construction of the podium earth intake structure, first constructing structural beam and slab on the first layer, then conducting a bottom-up construction of an above-ground structure of the podium and a top-down construction of an underground structure of the podium earth intake; by setting the basement earth intake structure, first constructing structural beam and slab on the underground N/2 layer, then conducting a bottom-up construction above the structural beam and slab on the underground N/2 layer and a top-down construction below the structural beam and slab on the underground N/2 layer, which accelerates the progress of earth intake closure construction, and is capable of timely completion of roof waterproofing and interpenetration of various professional projects.

5. After completing the earthwork excavation of the underground N layer, the present disclosure solves the net height limitation of underground excavation in the underground N layer by constructing two-span steel beams facing inward along the edge of the foundation pit to meet the stress requirements of the foundation pit support in this layer, that is, conducting excavation in the next layer (bottom plate layer), and improving the excavation efficiency. At the same time, the clearance height of 1.8 meters from the bottom of each layer of steel beam to the steel plate pavement is controlled to meet the horizontal transportation space requirements of steel beams.

ILLUSTRATION OF MAIN ATTACHED DRAWING MARKINGS 1. diaphragm wall permanent structure; 2. intermediate steel pipe column; 3. first layer structural beam and slab; 4. underground first layer structural beam and slab; 5. underground second layer structural beam and slab; 6. underground N−2 layer structural beam and slab; 7. underground N−1 layer structural beam and slab; 8. underground N layer bottom plate structure; 9. first layer open excavation elevation surface; 10. second layer underground excavation elevation surface; 11. third layer underground excavation elevation surface; 12. underground N−2th layer excavation elevation surface, 13. underground N−1th layer excavation elevation surface; 14. bottom elevation surface of the bottom plate; 15. underground first layer vertical shear wall; 16. underground second layer vertical shear wall; 17. underground N−2 layer vertical shear wall; 18. underground N−1 layer vertical shear wall; 19. underground N layer vertical shear wall; 20. tower above-ground structure; 21. above-ground structure of podium building; 22. steel cantilever structure unloading platform; 23. structural beam and slab on the first layer of the podium earth intake; 24. structural beam and slab on the underground first layer of the podium earth intake; 25. structural beam and slab of the underground second layer of the podium earth intake; 26. structural beam and slab of the underground N−2 layer of the podium earth intake; 27. structural beam and slab of the underground N−1 layer of the podium earth intake; 28. structural beam and slab on the first layer of the basement earth intake; 29. structural beam and slab on the underground first layer of the basement earth intake; 30. structural beam and slab on the underground second layer of the basement earth intake; 31. structural beam and slab on the underground N−2 layer of the basement earth intake; 32. structural beam and slab on the underground N−1 layer of the basement earth intake; 101. steel beam connecting plate; 102. steel beam; 201. Jack mechanism; 202. traction rope; 203. Jack fixing bracket; 204. steel plate pavement; 205. steel beam horizontal barge truck; 701. underground N−1 layer two-span structural steel beam facing inward along the edge of the foundation pit; 702. remaining structural beams and slabs on the underground N−1 layer.

DETAILED DESCRIPTION OF THE EMBODIMENTS

In order to facilitate the understanding of the present disclosure, a more comprehensive description will be provided below with reference to the relevant drawings. The attached drawings provide preferred embodiments of the present disclosure. However, the present disclosure may be implemented in many different forms and is not limited to the embodiments described herein. On the contrary, the purpose of providing these embodiments is to provide a more thorough and comprehensive understanding of the disclosed content of the present disclosure.

Unless otherwise explicitly stated, in the entire specification and claims, the term "comprising" or its transformations such as "includes" or "including" will be understood to include the stated elements or components, without excluding other elements or components.

Figure 1:
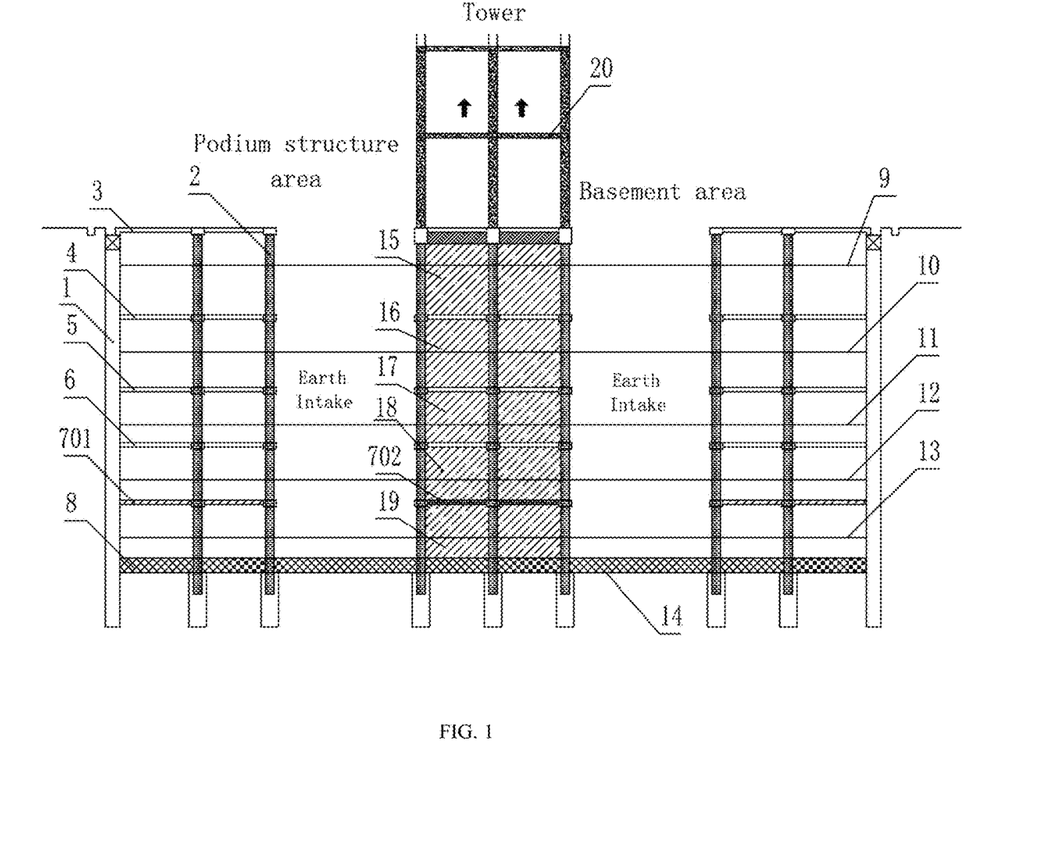
FIG. 1 is the first schematic diagram of a top-down construction method for a multi-layer basement with a full steel structure described in one embodiment of the present disclosure.
Figure 2:
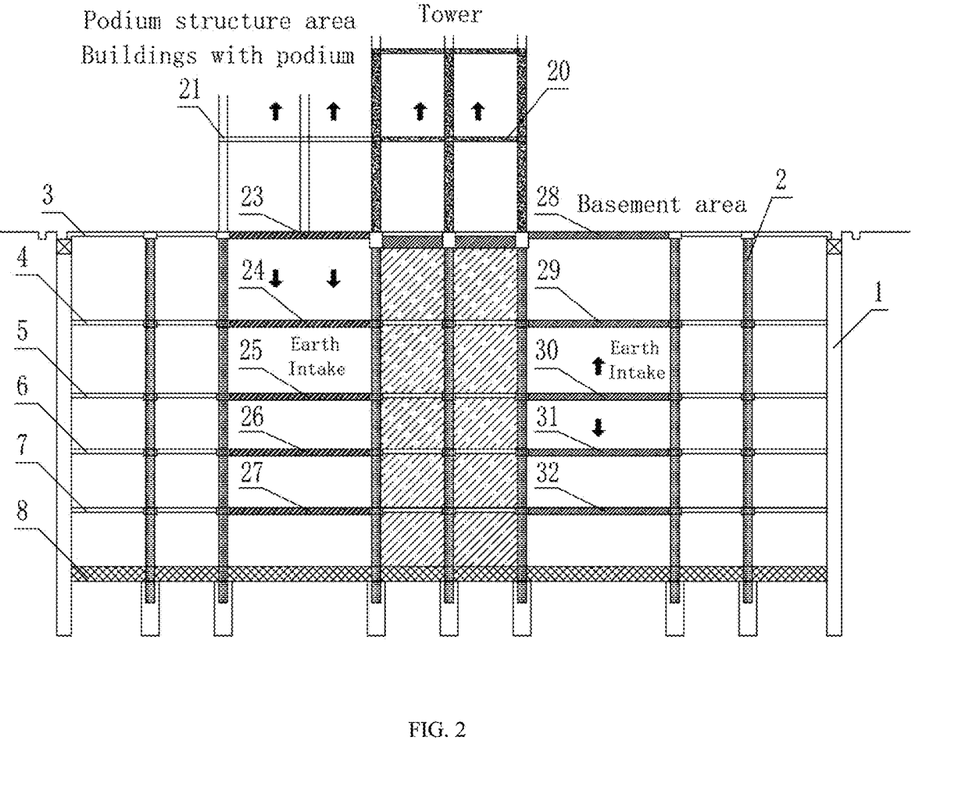
FIG. 2 is the second schematic diagram of the top-down construction method for a multi-layer basement with a full steel structure described in one embodiment of the present disclosure.

As shown in FIGS. 1-5, a preferred embodiment of the present disclosure provides a top-down construction method for a multi-storey basement with a full steel structure, including the following steps:

S1. constructing a diaphragm wall permanent structure 1 along a perimeter of a foundation pit, and setting an intermediate steel pipe column 2 inside the foundation pit, wherein a steel beam connecting plate 101 of basement layers are pre embedded into the diaphragm wall permanent structure 1 during construction.

Further, in step S1, the diaphragm wall permanent structure is used as the basement exterior wall, the steel beam connecting plate 101 of the basement layer is pre embedded, at the same time, plate connecting steel bars of the basement layer is also pre embedded. The intermediate steel pipe column 2 uses a method of one column and one pile, that is, the permanent column and temporary column of the structure are combined into one. The permanent column construction uses steel pipe concrete columns, and the external decorative surface is coated with anti-corrosion, fireproof, and decorative coatings. There is no need to wrap reinforced concrete, which saves time, effort and costs, simplifies the construction process, and shortens the construction period.

S2. conducting an open excavation on an underground first layer earthwork to a first layer open excavation elevation surface 9, and then constructing a first layer structural beam and slab 3, wherein the first layer structural beam and slab 3 is composed of steel beams and steel-bars truss decks, and the first layer structural beam and slab 3 is reserved with an earth intake in a podium area or a basement area, after a completion of the first layer structural beam and slab 3, constructing a tower above-ground structure 20 upward.

Further, in step S2, applying a backhoe excavation method starting from an edge of the diaphragm wall permanent structure 1, to conduct the open excavation from surrounding areas to the center of the earth intake until the first layer open excavation elevation surface 9, synchronously reserving a transportation channel for earthwork excavation, and using a tower crane to lift and construct the first layer steel beams and the steel-bars truss decks.

By providing a basement structural beam and slab which adopts a combination structure of steel beams and steel-bars truss decks, without the need for pouring cushion, setting up bent frames, and installing templates, so there is no need to wait for the concrete curing cycle and the removal of the bent frames. After the installation of the steel beams, the next layer of earthwork excavation can be carried out, which reduces the amount of material input, storage yard requirements, and material lifting times, so as to ensure smooth traffic organization on the site, accelerating the construction progress and shortening the construction period.

S3. conducting an underground excavation on an underground second layer earthwork to a second layer underground excavation elevation surface 10, and then constructing an underground first layer structural beam and slab 4 and an underground first layer vertical shear wall 15, wherein the underground first layer structural beam and slab 4 reserves an earth intake in the podium area and the basement area, and synchronously constructing the tower above-ground structure 20 upward.

Figure 3:
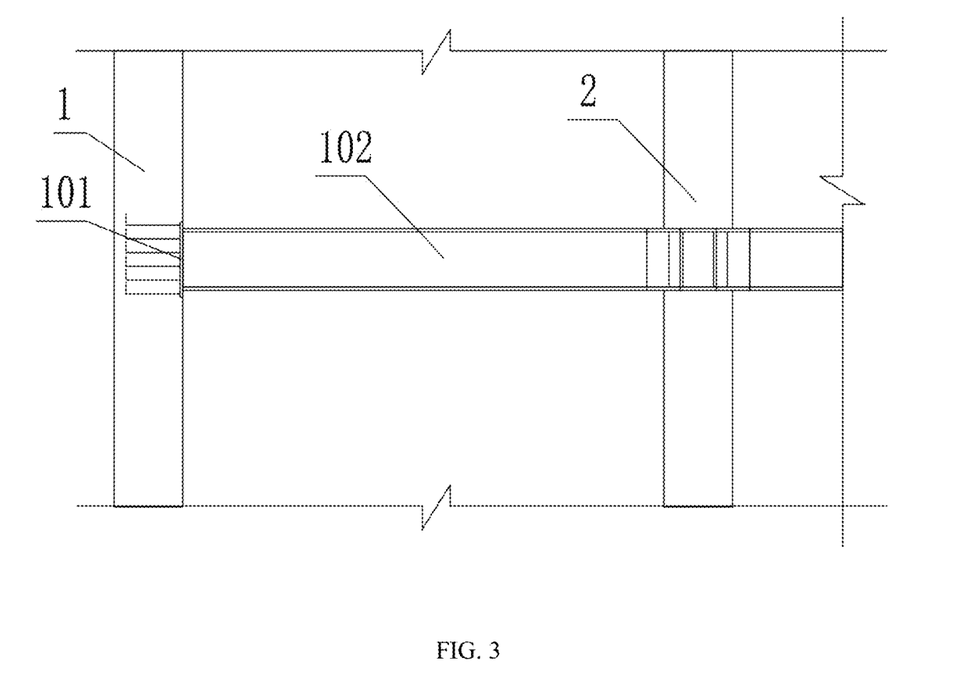
FIG. 3 is a schematic diagram of the connection structure between the diaphragm wall permanent structure and the steel beam described in one embodiment of the present disclosure.
Figure 4:
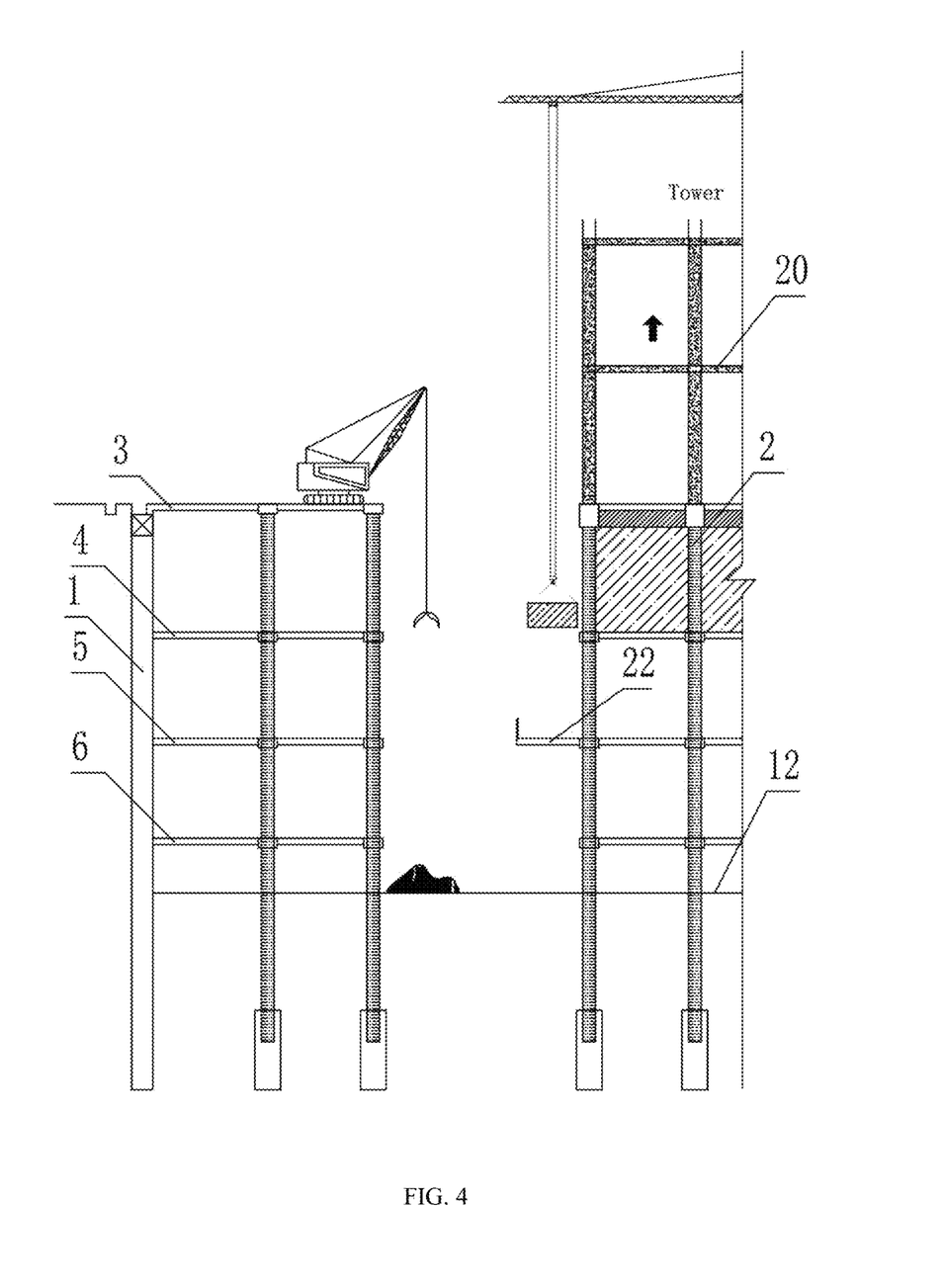
FIG. 4 is a schematic diagram of a basement profile steel cantilever structure unloading platform described in one embodiment of the present disclosure.
Figure 5:
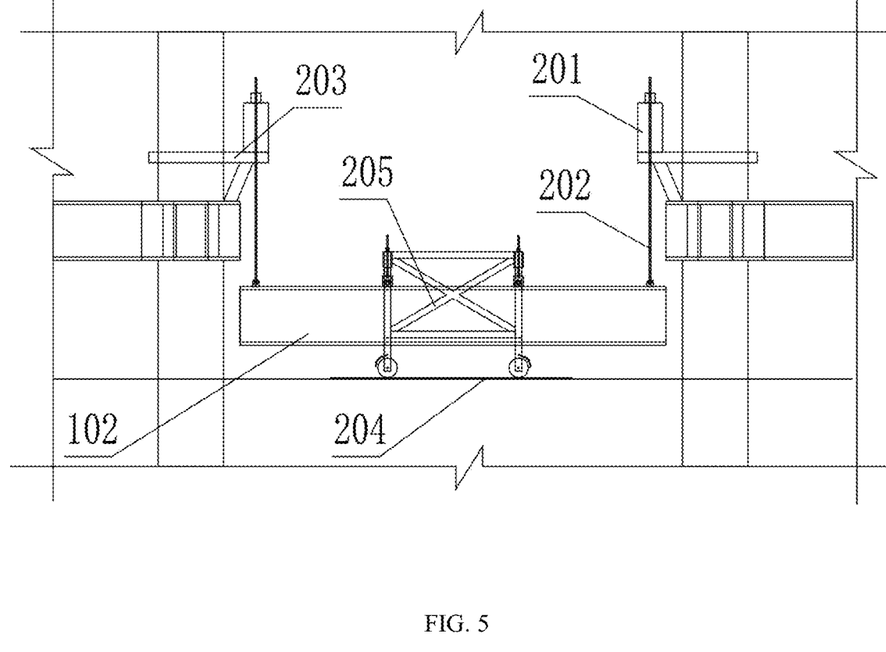
FIG. 5 is a schematic diagram of the horizontal transportation and vertical lifting of a basement steel beam according to one embodiment of the present disclosure.

Further, as shown in FIGS. 3-5, in step S3, after concrete curing strength of the first layer structural beam and slab 3 meets design requirements, applying a front shovel excavation method to excavate from the center of the earth intake to the surrounding area to the second layer underground excavation elevation surface 10, then laying a layer of a steel plate pavement 204 on the second layer underground excavation elevation surface 10. Preferably, the width of the steel plate pavement 204 is 3-5 meters. Then, using a truck crane to lift the steel beam 102 from the earth intakes of the podium and the basement to the second layer underground excavation elevation surface 10, using a steel beam horizontal barge truck 205 to transport the steel beam 102 from the earth intakes of the podium and the basement to a steel beam installation site through the steel plate pavement 204. Respectively installing one jack mechanism 201 above the steel beam on the same span of the construction layer and on the intermediate steel pipe column 2, installing and fixing the steel beam 102 and the intermediate steel pipe column 2 after conducting a vertical traction to the steel beam 102 to a designed steel beam elevation through an action of the jack mechanism 201 and a traction rope 202. The steel beam and the intermediate steel pipe column 2 can be installed and fixed by reserving brackets.

The present disclosure mainly uses a truck crane for lifting, supplemented by an above-ground tower crane for lifting, reducing the need for the above-ground tower crane and achieving efficient construction of both the above-ground structure and the basement simultaneously.

S4. according to step S3, excavating earthworks from an underground first layer to an underground N−1 layer in sequence until a designed excavation elevation surface, and constructing structural beams and slabs from an underground second layer to an underground N−2 layer and vertical shear walls from the underground second layer to the underground N−2 layer, and the structural beams and slabs from the underground second layer to the underground N−2 layer are reserved with earth intakes in the podium area and the basement area. Synchronously constructing the tower above-ground structure 20 upwards, wherein N is a total number of underground layers excavated.

In the step S4, the top-down construction of the underground second layer structural beam and slab 5 and below is carried out in sequence according to step S3: excavating the underground third layer earthwork to the third layer underground excavation elevation surface 11, and then constructing the underground second layer structural beam and slab 5 and the underground second layer vertical shear wall 16; the underground second layer structural beam and slab 5 has earth intake reserved in the podium area and the basement area, and synchronously constructing the tower above-ground structure 20 upwards; . . . ; excavating the underground N−1 layer earthwork to the underground N−1th layer excavation elevation surface 13, and then constructing the underground N−2 layer structural beam and slab 6 and the underground N−2 layer vertical shear wall 17; the underground N−2 layer structural beam and slab 6 has earth intake reserved in the podium area and the basement area, and synchronously constructing the tower above-ground structure 20.

Further, in step S4, setting a steel cantilever structure unloading platform 22 on a non soil taking equipment occupying side of any or more earth intakes in a structure from the underground first layer to the underground N−1 layer according to requirements. The steel cantilever structure unloading platform 22 is formed by welding or anchor bolts connecting of the cantilever steel beam and the frame steel beam, laying a steel plate platform and installing protective railings, as shown in FIG. 4. Preferably, the length of the cantilever is 2.5-3.0 meters and the width of the cantilever is 7-8.5 meters. The steel cantilever structure unloading platform 22 is configured to place vertical staircase channels, at the same time, after the completion of the structural beams and slabs from the underground first layer to the underground N-1 layer, they can be used for stacking steel bars, bricking-up, electromechanical device and other materials in the storage yard. Wherein, the steel cantilever structure unloading platform 22 can be equipped with one or more, and the steel cantilever structure unloading platform 22 can be disassembled, so it can be used in turn for downward layer repeatedly. The steel cantilever structure unloading platform serves as a passageway for personnel to go up and down stairs and a material supply platform, solving the problem of insufficient ground material storage yard. In addition, a truck crane is used for material transportation in the direction of up, down, and horizontal for extremely short distances at the same earth intakes, reducing the occupation of tower cranes and improving work efficiency.

S5. conducting the underground excavation on an underground N layer earthwork to a Nth layer excavation elevation surface, and constructing an underground N-1 layer two-span structural steel beam facing inward along the edge of the foundation pit 701. After the construction of the underground N-1 layer two-span structural steel beam facing inward along the edge of the foundation pit 701 is completed, it can meet the horizontal support force of the foundation pit for that layer and allow for the excavation of the lower layer of earthworks.

S6. conducting the underground excavation on earthworks of bottom plate layer to a bottom elevation surface of the bottom plate 14, constructing remaining structural beams and slabs on the underground N-1 layer 702 and an underground N-1 layer vertical shear wall 18, wherein there are earth intakes provided between the underground N-1 layer two-span structural steel beam facing inward along the edge of the foundation pit 701 and the remaining structural beams and slabs on the underground N-1 layer 702, and synchronously constructing the tower above-ground structure 20 upwards.

The earth intakes reserved between the underground N-1 layer two-span structural steel beam facing inward along the edge of the foundation pit 701 and the remaining structural beams and slabs on the underground N-1 layer are located in the podium area and the basement area respectively, corresponding to the earth intake reserved for structural beams and slabs above the underground N-2 layer in the podium area and the basement area.

By constructing two-span steel beams inward along the edge of the foundation pit after the completion of the excavation of the underground N layer, the stress requirements for the support of the foundation pit in this layer are met, and the excavation earthwork of the next layer (bottom plate layer) is carried out, which solves the net height limitation of the underground excavation of the underground N layer and improves the excavation efficiency.

S7. conducting the underground excavation on earthworks of a bearing platform and a water collection well to the designed elevation, and constructing an underground N layer bottom plate structure 8, and then constructing by an underground N layer vertical shear wall 19, wherein the underground excavation on the earthworks of the bearing platform and the water collection well is excavated from a support edge to the direction of the earth intake.

S8. constructing the earth intakes of the podium and the basement after the construction of the underground N layer vertical shear wall 19 is completed, wherein the earth intakes of the podium and the basement use a combination of the bottom-up construction and the top-down construction.

Further, in step S8, for the podium earth intake structure, first constructing structural beam and slab on the first layer of the podium earth intake 23, then conducting a bottom-up construction of an above-ground structure of the podium and a top-down construction of an underground structure of the podium earth intake. For the basement earth intake structure, first constructing structural beam and slab on the underground N/2 layer, then conducting a bottom-up construction of the structure above the structural beam and slab on the underground N/2 layer and a top-down construction of the structure below the structural beam and slab on the underground N/2 layer. Wherein, when N is an odd number, the underground N/2 layer is taken from one layer up from the middle layer of the basement.

Further, the tower above-ground structure 20 is started to conduct construction after the construction of the first layer structural beam and slab 3 is completed, and the structure of the podium area is started to conduct construction layer by layer upward after the construction of the structural beam and slab on the first layer of the podium earth intake 23 is completed, until the podium structure is capped.

Specifically, after the completion of the construction of the structural beam and slab on the first layer of the podium earth intake, sequentially constructing of the structural beam and slab on the underground first layer of the podium earth intake 24, the structural beam and slab of the underground second layer of the podium earth intake 25, . . . , the structural beam and slab of the underground N-2 layer of the podium earth intake 26, the structural beam and slab of the underground N-1 layer of the podium earth intake, and simultaneously constructing the above-ground structure of podium building 21. The structure of the basement earth intake is first constructed with the underground N/2 layer structural beam and slab, and then upward with the underground N/2-1 layer structural beam and slab, . . . , the structural beam and slab on the underground second layer of the basement earth intake 30, the structural beam and slab on the underground first layer of the basement earth intake 29, and the structural beam and slab on the first layer of the basement earth intake 28, while simultaneously constructing N/2+1 layer structural beam and slab, . . . , the structural beam and slab on the underground N-2 layer of the basement earth intake 31, and the structural beam and slab on the underground N-1 layer of the basement earth intake 32.

As shown in FIG. 5, installing one jack mechanism 201 above the steel beam of the same span on the construction layer and the intermediate steel pipe column 2 respectively, after the steel beam 102 is vertically pulled to the designed steel beam elevation by the jack mechanism 201 and the traction rope 202, installing and fixing the steel beam 102 and the intermediate steel pipe column 2. The steel beam and the intermediate steel pipe column 2 can be installed and fixed by reserving brackets.

After the completion of the construction of the bottom plate layer and basement civil defence wall structure in the present disclosure, the construction of the podium building earth intake and the basement earth intake structure is carried out using the combination of the bottom-up construction and the top-down construction. By conducting tower construction before podium construction, it not only ensures the progress of tower construction, but also allows for the spare area of podium for vehicle driving and material storage, effectively ensuring the coordination and smooth of above-ground construction and underground construction.

In one embodiment of the present disclosure, the first layer structural beam and slab 3 is uniformly arranged with a plurality of earth intakes in the podium area and the basement area, each of the earth intakes with a diameter of 8-16 meters and an area of 150-256 square meters, and a spacing of 30 meters between two adjacent earth intakes. Preferably, the area of the earth intake is 150 square meters.

By uniformly arranging earth intakes in the basement podium and basement area of the reverse working area, with large and numerous openings, it can meet the requirements of equipment occupancy, vehicle traffic organization, and necessary material storage yard planning, so as to improve natural ventilation effect, and reduce the investment of ventilation measures, reduce the horizontal excavation and transportation of earthworks and the investment of excavator equipment, and improve the efficiency of excavation.

In one embodiment of the present disclosure, constructing the underground first layer vertical shear wall 15 after an excavation of the underground second layer and the installation of the steel beams and a pouring of concrete for the steel-bars truss decks on the underground first layer; during the construction of the steel-bars truss decks on the underground first layer, the steel cantilever structure unloading platform 22 is configured to conduct horizontal transportation of materials of the steel-bars truss decks, and the underground second layer to the underground N−1 layer are constructed according to this procedure. Steel beams are installed below and above the shear wall for wall rooting, and the wall steel bars are connected to the steel beams using weldable sleeves.

In one embodiment of the present disclosure, when excavating earthwork from the underground first layer to the underground N−1 layer, a clearance height from a bottom surface of the steel beam to the steel plate pavement is 1.8 meters, meeting the horizontal transportation space requirements of the steel beam.

The present disclosure immediately constructs a vertical shear wall structure after pouring concrete into the steel-bars truss decks of each layer in the basement, which inserts the vertical structure or civil defense structure in advance compared to traditional methods, shortening the construction period. By setting up the earth intake structure of the podium, the first layer structural beam and slab will be constructed first, followed by the bottom-up construction of the above-ground structure of the podium and the top-down construction of the underground structure of the podium. The underground earth intake structure will first construct the underground N/2 layer structural beam and slab, then conducting a bottom-up construction of the structure above the structural beam and slab on the underground N/2 layer and a top-down construction of the structure below the structural beam and slab on the underground N/2 layer, accelerating the progress of earth intake closure construction, which can timely complete the roof waterproof and interpenetration of various professional projects, shortening the total construction period.

By adopting the top-down construction method for a multi-storey basement with full steel structure provided by the present disclosure, the overall construction period is shortened, the cost savings are significant, and the social and economic benefits of the enterprise are improved.

The aforementioned description of the specific exemplary embodiments of the present disclosure is for the purpose of illustration. These descriptions are not intended to limit the present disclosure to the specific form disclosed. It is evident that many modifications and variations can be made based on the above teachings. The purpose of selecting and describing exemplary embodiments is to illustrate the specific principles and practical applications of the present disclosure, so that those skilled in the art can implement and utilize various exemplary embodiments of the present disclosure, as well as various choices and changes. The scope of the present disclosure is intended to be limited by the claims and their equivalent forms.

What is claimed is:

1. A top-down construction method for a multi-storey basement, comprising:
    S1. constructing a diaphragm wall permanent structure (1) along a perimeter of a foundation pit, and setting an intermediate steel pipe column (2) inside the foundation pit, wherein a steel beam connecting plate (101) of basement layers are pre embedded into the diaphragm wall permanent structure (1) during construction;
    S2. conducting an open excavation on an underground first layer earthwork to a first layer open excavation elevation surface (9), and then constructing a first layer structural beam and slab (3), wherein the first layer structural beam and slab (3) is composed of steel beams and steel-bars truss decks, and the first layer structural beam and slab (3) is reserved with an earth intake in a podium area or a basement area, after a completion of the first layer structural beam and slab (3), constructing a tower above-ground structure (20) upwards;
    S3. conducting an underground excavation on an underground second layer earthwork to a second layer underground excavation elevation surface (10), and then constructing an underground first layer structural beam and slab (4) and an underground first layer vertical shear wall (15), wherein the underground first layer structural beam and slab (4) reserves an earth intake in the podium area and the basement area, and synchronously constructing the tower above-ground structure (20) upwards;
    S4. according to step S3, excavating earthworks from an underground third layer to an underground N−1 layer in sequence until a designed excavation elevation surface, and constructing structural beams and slabs from an underground second layer to an underground N−2 layer and vertical shear walls from the underground second layer to the underground N−2 layer, the structural beams and slabs from the underground second layer to the underground N−2 layer are reserved with earth intakes in the podium area and the basement area; synchronously constructing the tower above-ground structure (20) upwards, wherein N is a total number of underground layers excavated;
    S5. conducting an underground excavation on an underground N layer earthwork to a Nth layer excavation elevation surface, and constructing an underground N−1 layer inward two-span structural steel beam along an edge of the foundation pit (701);
    S6. conducting an underground excavation on earthworks of bottom plate layer to a bottom elevation surface of the bottom plate (14), constructing remaining structural beams and slabs on the underground N−1 layer (702) and an underground N−1 layer vertical shear wall (18), wherein there are earth intakes provided between the underground N−1 layer inward two-span structural steel beam along an edge of the foundation pit (701) and the remaining structural beams and slabs on the underground N-1 layer (702), and synchronously constructing the tower above-ground structure (20) upwards;

S7. conducting the underground excavation on earthworks of a bearing platform and a water collection well to the designed elevation, and constructing an underground N layer bottom plate structure (8), then constructing by an underground N layer vertical shear wall (19), wherein the underground excavation on the earthworks of the bearing platform and the water collection well is excavated from a support edge to a direction of the earth intake;

S8. constructing the earth intakes of the podium and the basement after the construction of the underground N layer vertical shear wall (19) is completed, wherein the earth intakes of the podium and the basement use a combination of the bottom-up construction and the top-down construction.

2. The top-down construction method for a multi-storey basement according to claim 1, wherein step S2 specifically comprises: applying a backhoe excavation method starting from an edge of the diaphragm wall permanent structure (1), to conduct the open excavation from surrounding areas to a center of the earth intake until the first layer open excavation elevation surface (9), synchronously reserving a transportation channel for earthwork excavation, and using a tower crane to lift and construct the first layer steel beams and the steel-bars truss decks.

3. The top-down construction method for a multi-storey basement according to claim 2, wherein the first layer structural beam and slab (3) is uniformly arranged with a plurality of earth intakes in the podium area and the basement area, each of the earth intakes with a diameter of 8-16 meters and an area of 150-256 square meters, and a spacing of 30 meters between two adjacent earth intakes.

4. The top-down construction method for a multi-storey basement according to claim 1, wherein step S3 specifically comprises: after concrete curing strength of the first layer structural beam and slab (3) meets design requirements, applying a front shovel excavation method to excavate from a center of the earth intake to the surrounding area to the second layer underground excavation elevation surface (10), then laying a layer of a steel plate pavement (204) with 3-5 meter wide on the second layer underground excavation elevation surface (10), using a truck crane to lift the steel beam (102) from the earth intakes of the podium and the basement to the second layer underground excavation elevation surface (10), then using a steel beam horizontal barge truck (205) to transport the steel beam (102) from the earth intakes of the podium and the basement to a steel beam installation site through the steel plate pavement (204); respectively installing one jack mechanism (201) above the steel beam on the same span of the construction layer and on the intermediate steel pipe column (2), installing and fixing the steel beam (102) and the intermediate steel pipe column (2) after conducting a vertical traction to the steel beam (102) to a designed steel beam elevation through an action of the jack mechanism (201) and a traction rope (202).

5. The top-down construction method for a multi-storey basement according to claim 4, wherein when excavating earthworks from the underground first layer to the underground N-1 layer, a clearance height from a bottom surface of the steel beam to the steel plate pavement is 1.8 meters.

6. The top-down construction method for a multi-storey basement according to claim 1, wherein step S4 further comprises: setting a steel cantilever structure unloading platform (22) on a non soil taking equipment occupying side of any or more earth intakes in a structure from the underground first layer to the underground N-1 layer according to requirements; the steel cantilever structure unloading platform (22) is formed by welding or anchor bolts connecting of the cantilever steel beam and the frame steel beam, with a length of the cantilever is 2.5-3.0 meters and a width of the cantilever is 7-8.5 meters; the steel cantilever structure unloading platform (22) is configured to place vertical staircase channels, and the structural beams and slabs from the underground first layer to the underground N-1 layer are used for material storage after the construction is completed.

7. The top-down construction method for a multi-storey basement according to claim 6, wherein constructing the underground first layer vertical shear wall (15) after an excavation of the underground second layer, an installation of the steel beams, and a pouring of concrete for the steel-bars truss decks on the underground first layer; during the construction of the steel-bars truss decks on the underground first layer, the steel cantilever structure unloading platform (22) is configured to conduct horizontal transportation of materials of the steel-bars truss decks, and the underground second layer to the underground N-1 layer are constructed according to this procedure.

8. The top-down construction method for a multi-storey basement according to claim 1, wherein step S8 specifically comprises: for the podium earth intake structure, first constructing structural beam and slab on the first layer of the podium earth intake (23), then conducting a bottom-up construction of an above-ground structure of the podium and a top-down construction of an underground structure of the podium earth intake; for the basement earth intake structure, first constructing structural beam and slab on the underground N/2 layer, then conducting a bottom-up construction of the structure above the structural beam and slab on the underground N/2 layer and a top-down construction of the structure below the structural beam and slab on the underground N/2 layer; respectively installing one jack mechanism (201) above the steel beam of the same span on the construction layer and the intermediate steel pipe column (2); after the steel beam (102) is vertically pulled to the designed steel beam elevation by the jack mechanism (201) and the traction rope (202), installing and fixing the steel beam (102) and the intermediate steel pipe column (2), and when N is an odd number, the underground N/2 layer is taken from one layer up from the middle layer of the basement.

9. The top-down construction method for a multi-storey basement according to claim 8, wherein the tower above-ground structure (20) is started to conduct construction after the construction of the first layer structural beam and slab (3) is completed, and the structure of the podium area is started to conduct construction layer by layer upward after the construction of the structural beam and slab on the first layer of the podium earth intake (23) is completed (23), until the podium structure is capped.

* * * * *